United States Patent [19]
Takeyama et al.

[11] 3,812,376
[45] May 21, 1974

[54] DEVICE FOR CONTROLLING DIMENSIONAL ACCURACY DURING MACHINING OF A CYLINDRICAL WORKPIECE

[75] Inventors: Hidehiko Takeyama; Koji Takada, both of Tokyo, Japan

[73] Assignee: Agency of Industrial Science & Technology, Tokyo, Japan

[22] Filed: Sept. 20, 1973

[21] Appl. No.: 399,065

Related U.S. Application Data
[63] Continuation-in-part of Ser. No. 227,579, Feb. 18, 1972, abandoned.

[52] U.S. Cl. .............. 250/572, 250/227, 250/562, 356/159
[51] Int. Cl. ............................................. G01b 7/12
[58] Field of Search ....... 250/550, 571, 572, 237 G, 250/562, 563, 227; 356/102–104, 199, 200, 159, 168, 242

[56] References Cited
UNITED STATES PATENTS

| | | | |
|---|---|---|---|
| 1,974,522 | 9/1934 | Twyman et al. | 250/222 X |
| 3,365,699 | 1/1968 | Foster | 356/167 X |
| 3,604,940 | 9/1971 | Matthews | 356/159 X |
| 3,518,007 | 6/1970 | Ito | 356/159 X |
| 3,659,950 | 5/1972 | Troll et al. | 356/199 |
| 3,604,806 | 9/1971 | Redman | 250/550 X |

FOREIGN PATENTS OR APPLICATIONS
1,229,739  12/1966  Germany .......................... 356/159

*Primary Examiner*—Walter Stolwein
*Attorney, Agent, or Firm*—Kurt Kelman

[57] ABSTRACT

The invention disclosed provides a device having means for emitting two beams of laser light in parallel and in contact respectively with an upper edge and a lower edge of a rotating cylindrical workpiece while under machining conditions such as in a lathe. The two laser beams hit the workpiece edges and then enter respective light receivers wherein diffraction images of the upper and the lower edges of the workpiece, which are sharpened by means of an optical filter, are defined on image planes formed with optical fibers. Intensity distributions of the diffraction images are converted into electric signals and processed in order to identify the diameter at the machining point of the workpiece. In case the difference between the detected diameter and a desired diameter exceeds a specified value of allowable error, a correction signal is transmitted from a provided means which causes a tool position controlling device to adjust the position of the tool, thus ensuring accurate turning of the workpiece within a specified tolerance while rotating in the course of machining.

5 Claims, 9 Drawing Figures

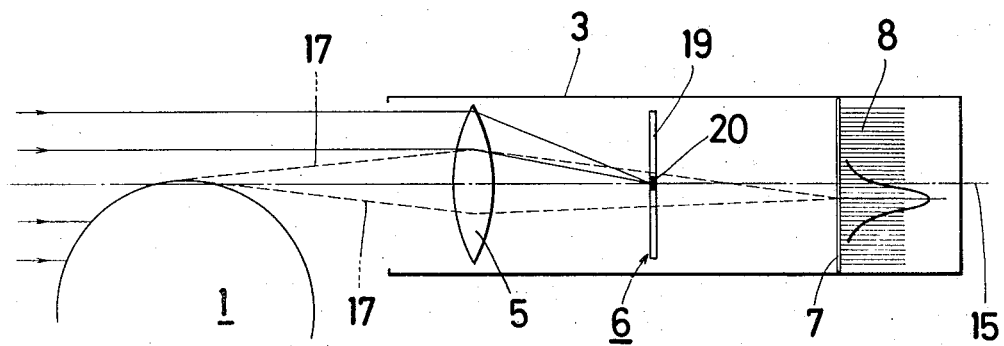
Fig.2
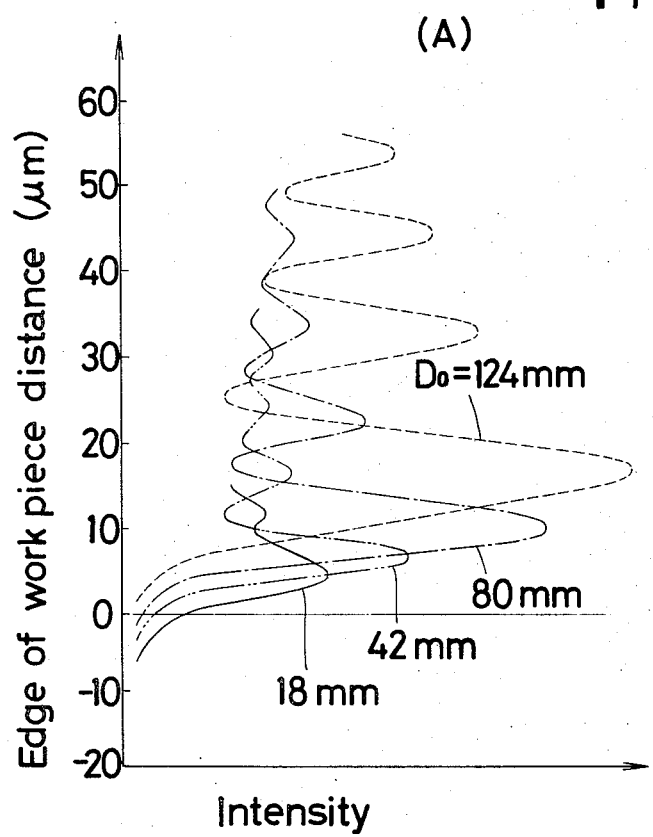
Fig.3 (A)
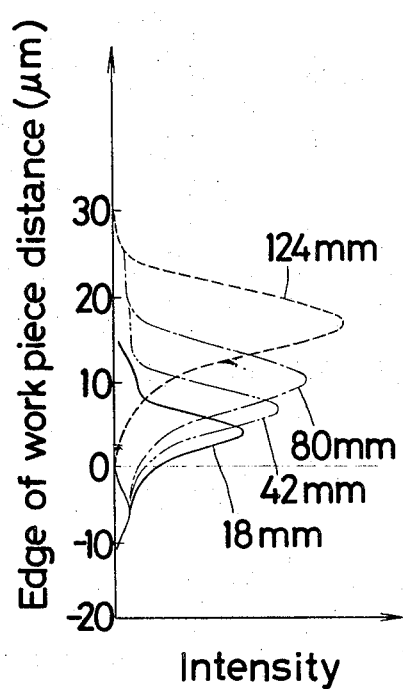
(B)

DEVICE FOR CONTROLLING DIMENSIONAL ACCURACY DURING MACHINING OF A CYLINDRICAL WORKPIECE

REFERENCE TO RELATED APPLICATION

This application for U.S. Patent is a continuation-in-part of application Ser. No. 227,579, filed Feb. 18, 1972, now abandoned.

BACKGROUND OF THE INVENTION

The present invention relates to a device for controlling dimensional accuracy during machining of a cylindrical workpiece such that the workpiece is turned positively within a specified tolerance while the diameter of the workpiece is being constantly detected and compared during the course of machining.

Dimensional accuracy in machining depends upon several factors including the accuracy at which the mechanisms controlling the machine tool is moved, the deformation of the machine tool and workpiece due to cutting force as well as to the heat generated during cutting, and the wear of the cutting edge. Of these general factors, the last two in particular vary complicatedly even with one and the same machine tool according to the shape and material of the workpiece, machining condition and operating time. Thus, it is almost impossible to predict the amount of such disturbances. With regard to these latter general factors, therefore, no fundamental solution to the problem can be expected without detecting the dimensional error of the workpiece and duly compensating and controlling the cutting tool position directly and constantly during the machining process. Thus, a constant monitor system is required.

The position controlling mechanism of a modern numerically controlled machine tool is stiff and accurate enough to realize a considerably high accuracy of machining when monitored by an operator. However, such prior art devices cannot always exhibit full intrinsic capability owing to the above-mentioned unpredictable factors which are incapable of being monitored constantly by an operator. Thus, a serious functional limit exists in such prior art devices, i.e., for the numerically controlled machine tool, and thereby such prior art devices are ineffective for use in high level automatization and systematization of production.

Automated means for detecting the diameter of a cylindrical workpiece under machining have been proposed. For example, one known method consisting of installing a rotating contact wheel of known diameter in contact with the rotating workpiece such that measurement of the peripheral speed of the workpiece is determined, which is assumed to be identical with the peripheral speed of the contact wheel. This method, however, has significant disadvantages since it is difficult to detect the diameter accurately unless the workpiece is of a relatively large diameter and rotating relatively slowly.

It has now been found that by practice of the present invention, there is provided a controlling device which enables a machine tool to finish a cylindrical workpiece within a specified tolerance through constant accurate detection of the diameter of the workpiece under machining conditions.

In order to detect the diameter of a workpiece, the present device employs to great advantage an optical means which enables non-contact and direct constant detection of the diameter of the workpiece under machining conditions. Thus, the present device provides an effective controlling means which overcomes the difficulty of prior art devices for accurate detection of dimensional error during turning in the course of machining. The present device is also applicable to detection and control of the machining accuracy of complicatedly profiled workpieces which are acutely desired in machining with numerically controlled lathes and other machine tools.

SUMMARY OF THE INVENTION

Generally stated, the present device for controlling dimensional accuracy in machining a cylindrical workpiece comprises an in-process detector of the workpiece diameter and an operational device. The former includes means for emitting two beams of laser to hit the upper and lower edges of the workpiece, a pair of light receivers each disposed to receive the diffractive rays from the upper and lower edges of the workpiece and a light-electricity converter. The light receivers each consist of a focus lens, an optical filter for excluding zero-order component in diffractive rays, and an image plane defined by a plurality of optical fibers disposed for receiving diffractive rays which produces the diffraction image of the workpiece edge. An light-electricity converter is included for converting intensity distribution of the diffraction image into electrical signals and for detecting the dimensional error.

An operational device is included for comparing the machining error with a specified dimensional tolerance and for transmitting a correction signal to a tool position controlling device of the maching tool when the machining error is greater than the specified dimensional tolerance.

Additional advantages and features of the present invention will be more clearly understood from the following detailed description taken in connection with the accompanying drawings.

BRIEF EXPLANATION OF THE DRAWING

FIG. 2 is an explanatory view of an optical system useful in the device shown in FIG. 1;

FIG. 3(A) and FIG. 3(B) are graphs showing in comparison the intensity distributions of diffraction images when the optical system of FIG. 2 is not fitted with an optical filter and when said system is fitted with an optical filter respectively;

DETAILED EXPLANATION OF THE INVENTION

Figure 1:
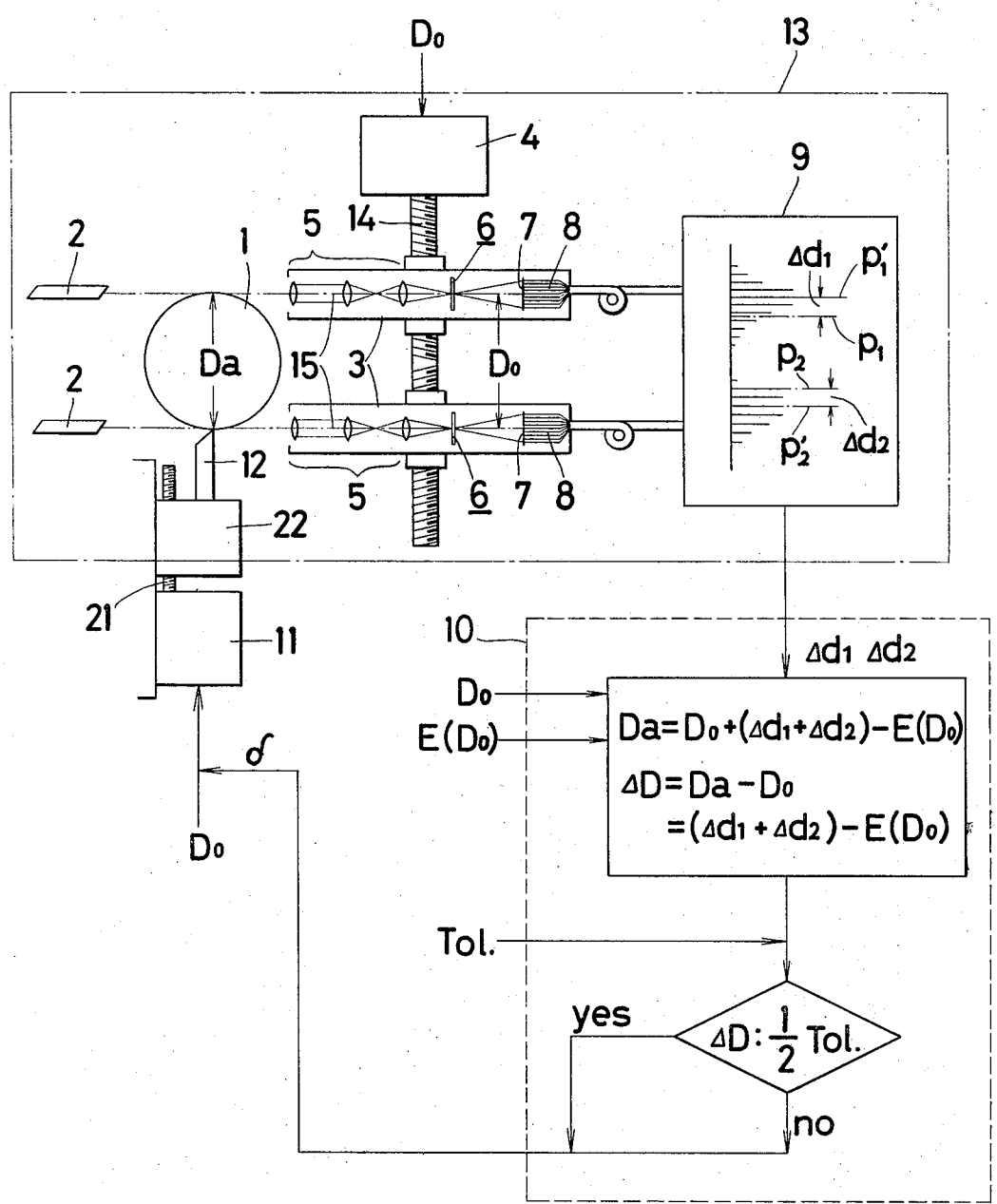
FIG. 1 is a general diagram illustrating an embodiment of elements forming a device of the present invention.

Referring to the drawings, FIG. 1 illustrates workpiece 1 being machined in diameter $D_a$ by a lathe, for example, using cutting tool 12. The device of the present invention comprises an in-process detector 13 of the workpiece and an operational device 10 wherein a pair of laser beams of lasers 2 and a pair of light receivers 3 are so provided that their optical axes 15 are in parallel to each other with the distance between the optical axes being adjustable accurately to the desired value of diameter $D_o$ of the workpiece by positioning unit 4. Positioning unit 4 may be a signal controlled motor which by means of oppositely threaded shaft 14 causes light receivers 3 coupled thereon to either approach each other or to move apart as required.

Figure 7:
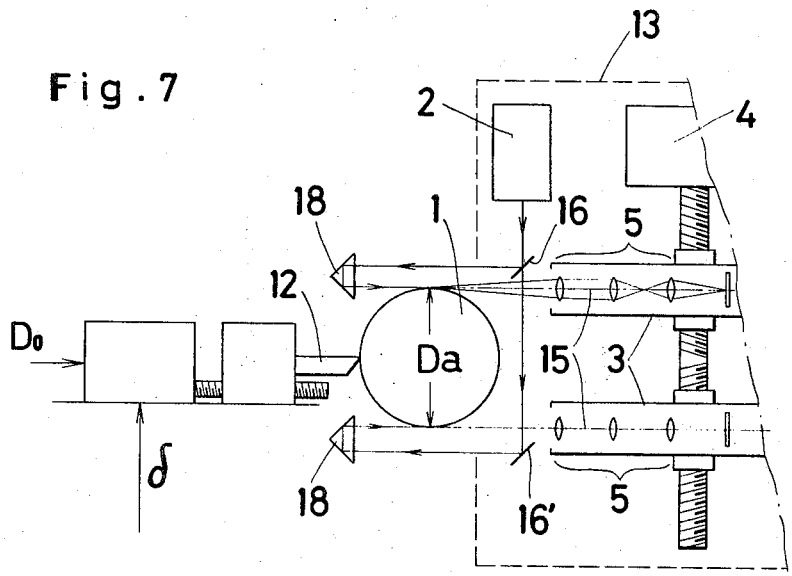
FIG. 7 is a diagram illustrating another embodiment of the device according to the present invention.

Although FIG. 1 shows an embodiment provided with a pair of lasers, it is possible as shown in FIG. 7 to split the laser beam from a single laser 2 by means of a half mirror 16 to obtain a pair of laser beams which are refracted by prisms 18.

The function of the light receiver 3 of FIG. 1 and FIG. 2 will be now more readily apparent. For example, light receiver 3 as shown in FIG. 2, is composed of an object lens unit 5 for focusing the diffractive ray 17 from the edge of workpiece 1, an optical filter 6 placed at the focal point of the lens unit 5 and an image plane 7 which is made of a plurality of optical fibers 8 disposed in parallel to the optical axis 15, on which the diffraction image of the edge of workpiece 1 is projected by the lens unit 5.

Figure 6:
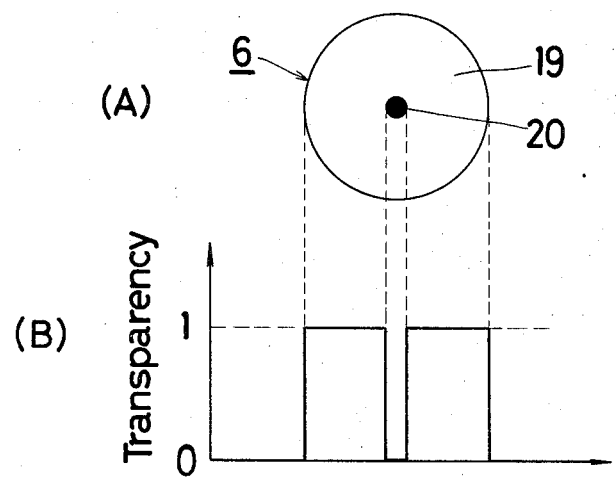
FIG. 6(A) is a front elevational view of an optical filter useful for the optical system of the present device.
FIG. 6(B) is a graph showing the transparency characteristics of the optical filter of FIG. 6(A)

Optical filter 6 is significant in the optical system of the present device since it makes the image of the round edge of the workpiece sharp enough to permit accurate determination of the diameter by excluding zero-order component in the diffractive rays while permitting higher-order components in the diffractive rays to pass therethrough. The optical filter 6 (FIG. 6(A)) may be composed of, for example, a transparent body 19 such as a glass plate, plastic plate or the like, which has at its center a light absorptive spot 20. As represented in FIG. 6(B), transparent body 18 passes light with high transparency while the light absorptive spot 20 absorbs all light which strikes it. The light absorptive spot 20 may be simply a black spot of paint or carbon characterized in that it acts as an optical absorber.

It will thus be appreciated that filter 6 passes only diffractive rays therethrough while absorbing zero-order diffractive rays. For example, the refracted rays shown as solid lines in FIG. 2 are zero-order diffractive rays which are focused on the absorptive spot 20 of the filter 6 whereas the diffractive rays illustrated schematically in broken lines pass outside the area of the spot of the filter. Thus, the only the desired rays pass through the filter thereby allowing a highly accurate image of the workpiece edge to be projected onto the image plane 7 defined by the ends of optical fibers 8. The effect of the filter will be explained more precisely later.

Optical fibers 8 lead to a light-electricity converter 9 (FIG. 1) which converts the intensity distribution of the diffraction image projected on the image plane 7 into time serial electric signals.

Numerous means are well known to the art for converting the intensity of a light beam into an electrical signal. Most any of such light-to-electricity conversion means may be used as the functional component of converter 9.

Figure 5:
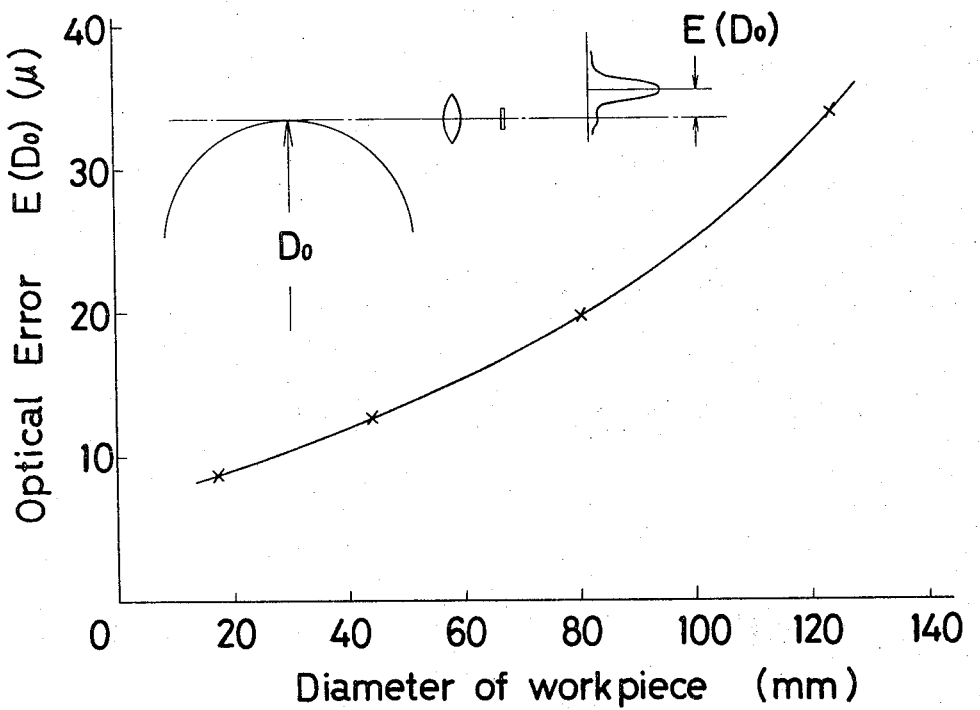
FIG. 5 is a graph showing the correlation between the exact value and the optical error inherent in a measuring system using a diffraction image.

In the light-electricity converter 9, $P_1$, $P_2$ are the optical axes (centers) of light receiver 3 and the distance ($\Delta d_1$, $\Delta d_2$) between each axis and the respective peak point ($P'_1$, $P'_2$) of the diffraction image corresponding to one edge of the workpiece 1 is obtained as an electric signal. The signals obtained ($\Delta d_1$, $\Delta d_2$) are transmitted as input to operational device 10. Thus, the actual present diameter $D_a$ of workpiece 1 can be correctly calculated from the signals ($\Delta d_1$, $\Delta d_2$) taking into consideration the desired value $D_o$ between the axes of light receiver 3 and the optical error $E(D_o)$ inherent in a measurement system which relies on a diffraction image. That is to say, even when the workpiece is machined to the desired diameter $D_o$ and the upper and lower edges of the workpiece become tangential to the optical axes, the peaks of the diffraction image on the image plane are still slightly separated from optical axes of the light receiver. This separation which is inherent in a measurement system using a diffraction image varies with the desired diameter $D_o$ as shown in FIG. 5. For example, it is about 9 $\mu$m for a workpiece having a diameter of 18 mm and about 20 $\mu$m for a workpiece having a diameter of 80 mm. Consequently, the distances $\Delta d_1$, $\Delta d_2$ contain optical error components which must be taken into consideration to determine the precise machining error $\Delta D$ in the diameter of the workpiece.

The value of the machining error $\Delta D$ obtained is compared with the dimensional tolerance Tol supplied beforehand to the operational device and when error $\Delta D$ is larger than dimensional tolerance Tol, a correction signal $\delta$ representing the smallest degree to which the machining operation can be controlled is transmitted to the tool position controlling device 11 which controls the cutting tool position so as to decrease the dimensional error $\Delta D$. After the transmission of each correction signal $\delta$, $\Delta D$ is again compared with Tol and if $\Delta D$ is found larger, another correction signal $\delta$ is transmitted. This procedure is repeated until the error $\Delta D$ becomes smaller than the specified dimensional tolerance Tol. Thus, the machining error in diameter $\Delta D$ is obtained.

In operation, the distance between the optical axes 15 of light receivers 3 is initially adjusted by the positioning unit 4 so that the distance becomes equal to the desired diameter $D_o$ of the workpiece 1 and the laser beams hit the upper edge and the lower edge of the workpiece. The diffractive rays coming from both edges of the workpiece enter lens units 5 and are projected on the image plane 7 through the filter 6.

Filter 6, placed at the focal point of each lens unit 5, absorbs only zero-order component of the diffractive rays. However, the other component of the diffractive rays passing through filter 6 make special sharp images on image plane 7 which is made of a plurality of optical fibers 8.

When an optical fiber of 50 $\mu$m diameter and an optical system of 10 times magnification is employed, the diameter of the workpiece can be detected with the accuracy of 5 $\mu$m. Those diffraction images which correspond to the edges of the workpiece appear as bright lines. These highly clear diffraction images can be easily obtained by the use of laser light. The intensity distributions of the diffraction image produced on the image plane 7 are transmitted to the light-electricity converter 9 by the optical fibers 8 and are converted into electric signals, thus making it possible to obtain the peak points of the images $P'_1$ and $P'_2$ corresponding to the upper and lower edges of the workpiece, respectively, and to obtain the distances $\Delta d_1$ and $\Delta d_2$ between the reference points $P_1$, $P_2$ (both ends of the two optical fiber bundles corresponding to points $P_1$ and $P_2$ are placed exactly on the optical axes at the image planes) and the peak points $P'_1$, $P'_2$. The distances $\Delta d_1$ and $\Delta d_2$ are converted into electrical signals and then these signals are transmitted to the operational device 10 for performing the correcting process which will be described later.

Operational device 10 is an electric calculator used to determine the relative value previously discussed and having means for transmitting a signal $\delta$ to tool positioning unit 11, i.e., a motor controlled by a signal which rotates shaft 21 relative to tool support 22. Thus, a conventional calculator may serve as the functional component of operational device 10. Such calculator may be either digital systems or analogue systems as desired.

The same result can be obtained when instead of the optical fibers 8 narrow slits are used ahead of the light-electricity converter. In this case, however, the light-to-electrical signal conversion means is positioned adjacent the narrow slits to receive the light in otherwise similar fashion to when the optical fibers are employed.

Now the effect of the optical filter 6 provided behind the lens unit 5 of the light receivers 3 and the optical phenomenon which attains the effect will be described by referring to FIG. 3.

FIG. 3 shows a comparison between the intensity distributions of the diffraction image of the workpiece edge obtained when filters are provided in the optical systems and that obtained when filters are not provided.

FIG. 3(A) is a graph showing the intensity distributions of the diffraction images measured on the image plane 7 when filters are not used. The intensity distributions largely vary according to the diameter of the workpiece and the shapes of the peaks are not sharp enough as seen from this graph. This phenomenon is highly undesirable for controlling the machining dimension with high accuracy.

On the other hand, when the zero-order component of diffractive rays is optically cut by using filters in the optical system and the first-order diffraction fringe is emphasized, the result is as shown in FIG. 3(B). In this case, the signals are low in intensity but they are very easy to process and sharper.

Figure 4:
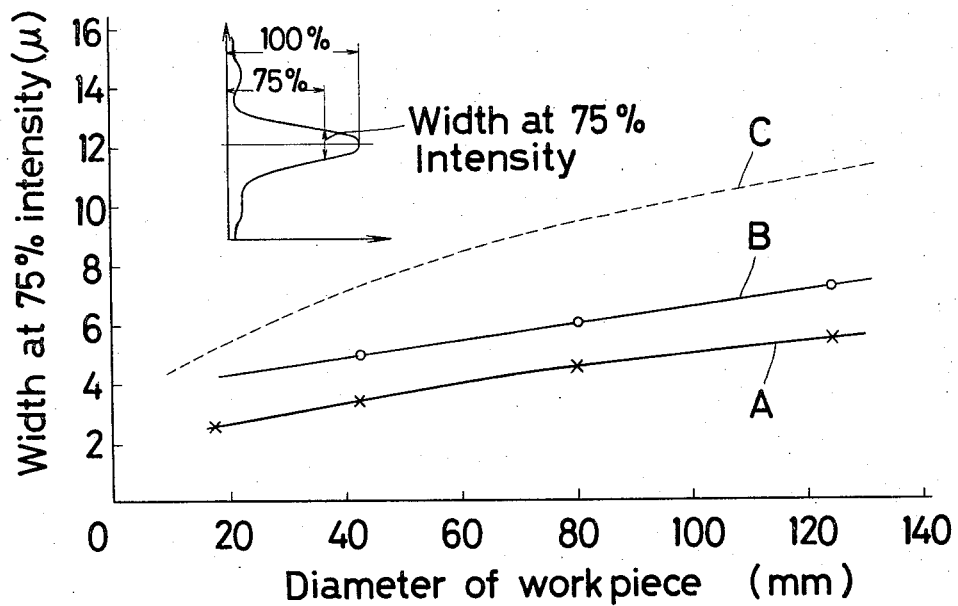
FIG. 4 is a graph showing in comparison the sharpness of the diffraction images with and without an optical filter in terms of the width of 75 percent intensity of the diffraction images.

When the comparison of the width of image at 75 percent intensity is further made between the case where filters are not used and the case where filters are used, it is found from FIG. 4 that in the latter case the width is narrower and more precisely measurable. Curve "A" and curve "B" represent the width at 75 percent intensity when filters are used and when filters are not used, respectively. While, for example, the width at 75 percent intensity for a diameter of 42 mm is about 3.5 $\mu$m wide in the former case, that for the same diameter is about 5.0 $\mu$m wide in the latter case. Again, while that for a diameter of 124 mm is about 5.6 $\mu$m in the former case, that for the same diameter is about 7.3 $\mu$m in the latter case. Therefore, when filters are employed, the image becomes sharper and more precisely measurable as stated above. Curve "C" represents half of the standard dimensional tolerance IT Grade 6 for reference. The machining accuracy usually required in turning operations is up to IT Grade 6, and accuracy higher than this is in the range of grinding operation. So when filters are used at the foci of the optical systems, they provide the more sufficient sharpness for the detection of dimensional error necessary to control the accuracy within a tolerance up to IT Grade 6, which is usually encountered in turning operations.

The first order diffraction fringes appearing on the image planes 7 owing to the fact that the diffracted rays do not correctly correspond to the edges of the workpiece but actually are deflected outwardly from the edges, as seen from FIG. 3. In other words, the distance between the diffraction images shows a value larger then that of the actual diameter of the workpiece, the degree of optical error varying according to the diameter. The correlation between the exact value of diameter $D_o$ and the optical error of image $E(D_o)$ is shown in FIG. 5. In this figure, the optical error between the peak point and exact value is about 9 $\mu$m for a cylinder of 18 mm diameter and about 20 $\mu$m for one 80 mm diameter, the optical error $E(D_o)$ increasing as the diameter of the cylinder increases.

For this reason, the distances $\Delta d_1$ and $\Delta d_2$ obtained by the light-electricity converter 9 include the machining error $\Delta D$ and the aforementioned optical error $E(D_o)$.

If, therefore, the optical error $E(D_o)$ which has been predetermined experimentally and the desired diameter $D_o$ of the workpiece in addition to $\Delta d_1$ and $\Delta d_2$ are fed to the operational device 10, the device will calculate the machining error $\Delta D$ in the manner that will now be described.

Because the actual diameter $D_a$ of the workpiece is the sum of the desired value $D_o$ and the value obtained by deducting the optical error $E(D_o)$ from the value $\Delta d_1$ and $\Delta d_2$, this relation may be expressed as:

$$D_a = D_o + [(\Delta d_1 + \alpha d_2) - E(D_o)]$$

Therefore, the machining error $\Delta D$ may be obtained from the following equation:

$$\Delta D = D_a - D_o = (\Delta d_1 + \Delta d_2) - E(D_o)$$

The machining error $\Delta D$ thus obtained is compared with the specified dimensional tolerance Tol previously introduced into the operational device. If the former is found greater than the latter, a tool position correction signal $\delta$ is representing the smallest degree to which the machining operation can be controlled transmitted to the tool position controlling device 11 of machine tool. When, after transmission of a single correction signal $\delta$, the machining error $\Delta D$ is still found to be larger than Tol, successive signals $\delta$ are transmitted until the error $\delta D$ is found to be less than Tol. Thus by supplying a series of signals $\delta$ each of which represents the smallest degree to which the machining operation can be controlled, it is possible to prevent overcutting of the workpiece to a diameter smaller than the desired value. The position of the tool is corrected in a known desired manner.

The dimensional accuracy controlling device of the present invention, as already described, detects the machining accuracy without contacting the workpiece and controls the accuracy continuously while the workpiece is under machining, thereby always ensuring accurate and efficient machining even when an extremely small dimensional tolerance is specified. Of course, this controlling device is also applicable to the detection of workpiece dimensions after its machining has been completed.

It will be understood that the foregoing description is given merely by illustration and that many variations may be made therein by those skilled in the art without departing from the scope of the present invention.

What is claimed is:

1. A device for controlling dimensional accuracy in machining a cylindrical workpiece which device comprises in combination, a light source emitting laser beams which hit the upper and lower edges of the workpiece respectively, a pair of light receivers each disposed to receive diffracted rays from the upper and lower edges of the workpiece, said light receivers each consisting of an object lens unit, an optical filter excluding zero-order component of diffracted rays, and an image plane, said image plane having a plurality of optical fibers for receiving a diffracted image of the workpiece edge, means for converting intensity distribution of said diffracted image into electrical signals, and identifying the actual diameter of the workpiece being machined, means for comparing the actual diameter with a desired diameter of workpiece and means for transmitting a correction signal to a tool position controlling device of a machine tool when the deflection obtained by said comparison is greater than a specified dimensional tolerance.

2. The device according to claim 1 wherein optical filters are provided on the respective focal points of the object lenses.

3. The device according to claim 1 wherein each optical filter has a transparent body with a light absorption spot at the center thereof.

4. The device according to claim 3 wherein the body is glass and said spot is black pigment.

5. The device according to claim 3 wherein the body is plastic and said spot is black.

* * * * *

UNITED STATES PATENT OFFICE
CERTIFICATE OF CORRECTION

Patent No. 3,812,376     Dated May 21, 1974

Inventor(s) Hidehiko Takeyama et al

It is certified that error appears in the above-identified patent and that said Letters Patent are hereby corrected as shown below:

On the title page, after "/63/" insert:--

/30/ Foreign Application Priority Data
Feb. 18, 1971    Japan ................... 7599/71

Signed and sealed this 24th day of September 1974.

(SEAL)
Attest:

McCOY M. GIBSON JR.          C. MARSHALL DANN
Attesting Officer            Commissioner of Patents